Figure 1:
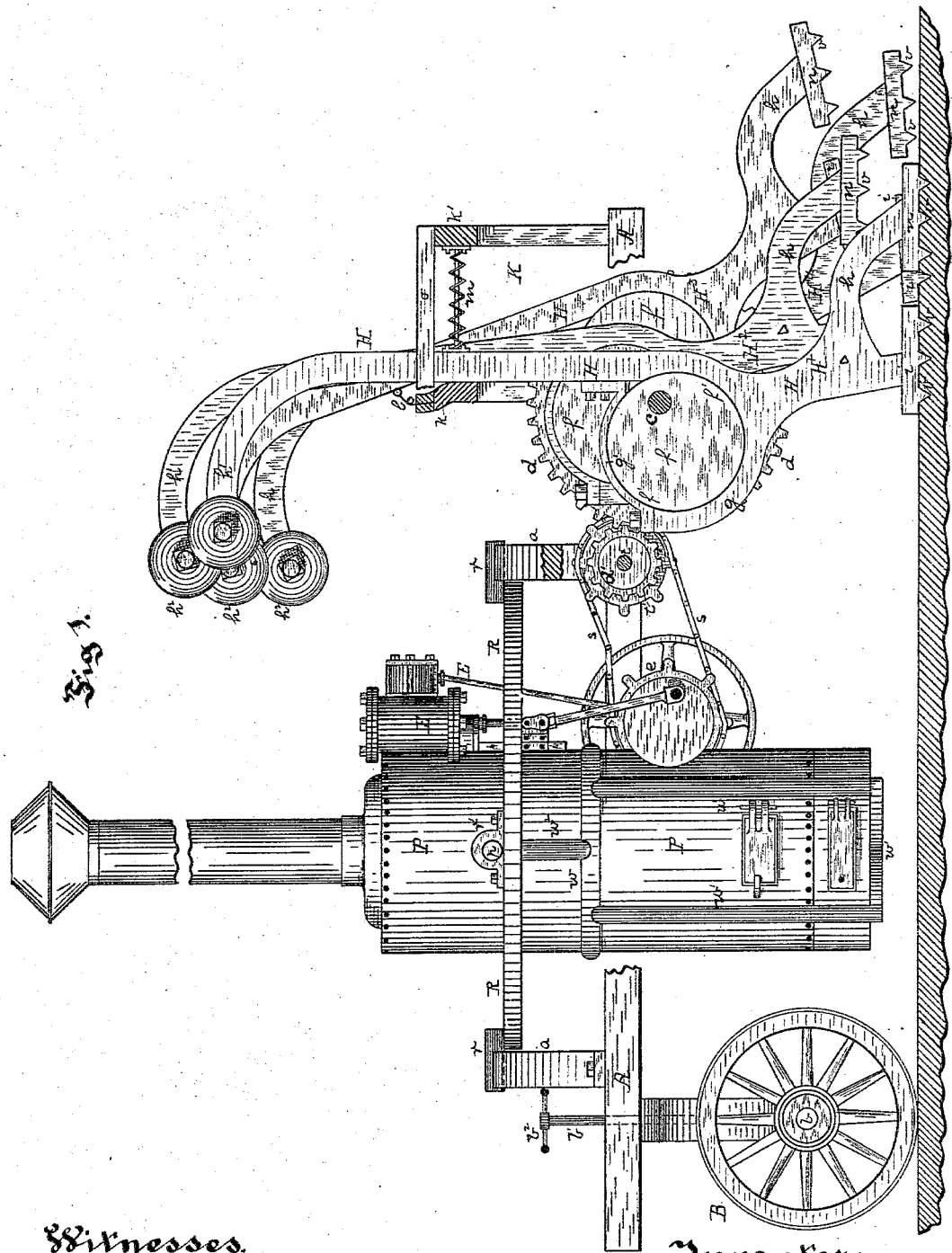

(No Model.) H. B. McMURRAY. 3 Sheets—Sheet 1.
TRACTION ENGINE.

No. 296,862. Patented Apr. 15, 1884.

Witnesses.
L. P. Blanchard
J. W. Cooke

Inventor.
Henry B. McMurray
By James L. Ray
Attorney (No Model.) 3 Sheets—Sheet 2.

H. B. McMURRAY.
TRACTION ENGINE.

No. 296,862. Patented Apr. 15, 1884.

Witnesses:
L. P. Blanchard
J. W. Cooke

Inventor.
Henry B. McMurray
by James F. Ray
Attorney (No Model.) 3 Sheets—Sheet 3.
H. B. McMURRAY.
TRACTION ENGINE.
No. 296,862. Patented Apr. 15, 1884.
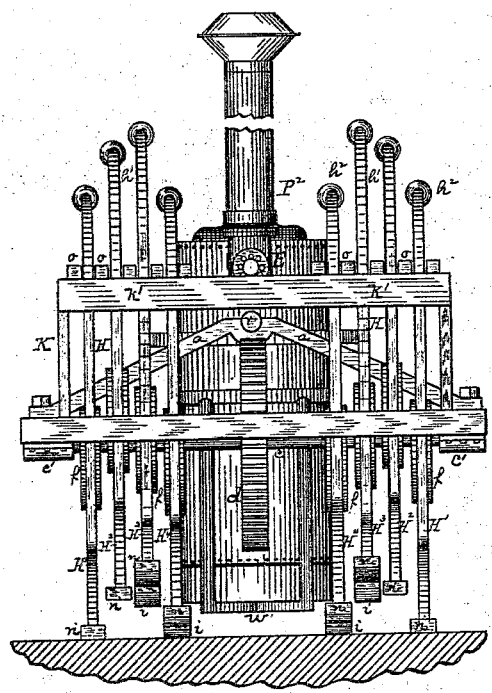
Fig 3.
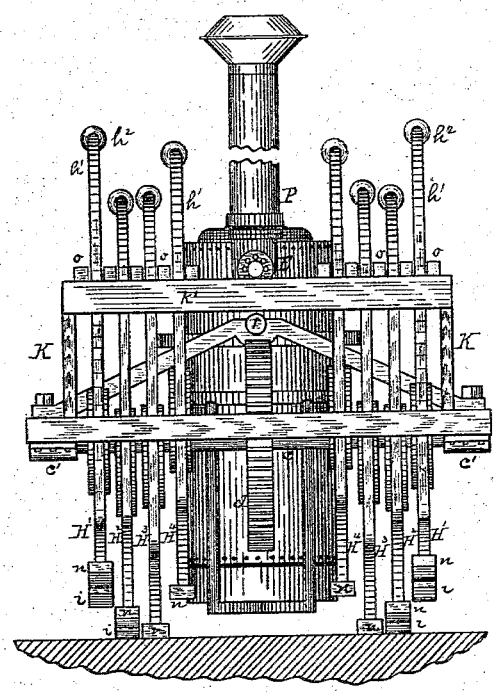
Fig 4.
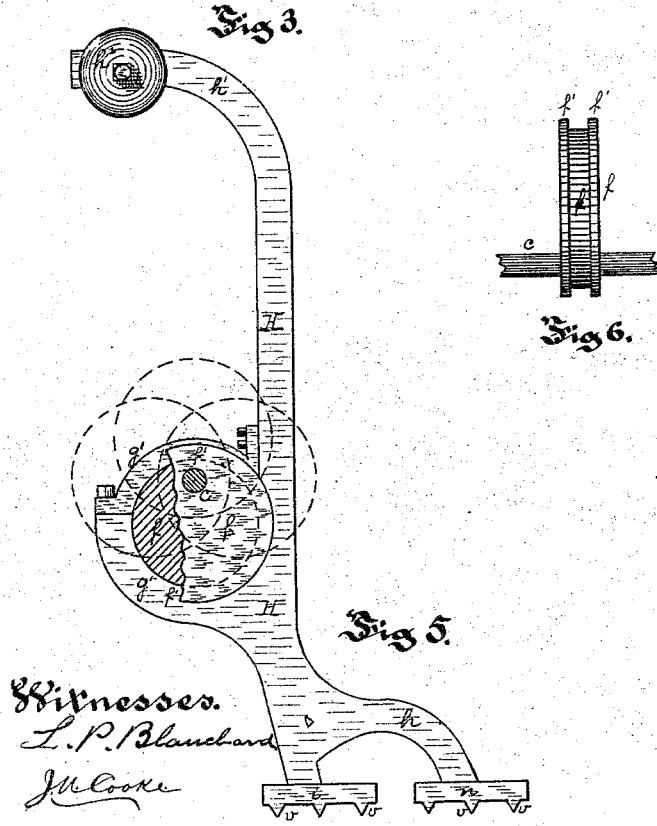
Fig 5.
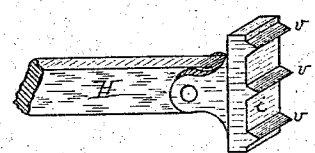
Fig 6.
Fig 7.
Witnesses.
L. P. Blanchard
J. M. Cooke
Inventor.
Henry B. McMurray
by James D. Ray
Attorney

UNITED STATES PATENT OFFICE.

HENRY B. McMURRAY, OF BURGETTSTOWN, PENNSYLVANIA.

TRACTION-ENGINE.

SPECIFICATION forming part of Letters Patent No. 296,862, dated April 15, 1884.

Application filed December 13, 1883. (No model.)

*To all whom it may concern:*

Be it known that I, HENRY B. MCMURRAY, of Burgettstown, in the county of Washington and State of Pennsylvania, have invented a new and useful Improvement in Traction-Powers; and I do hereby declare the following to be a full, clear, and exact description thereof.

My invention relates to the traction-powers employed in fields and roads for the purpose of drawing plows or other agricultural implements, cars, wagons, or like vehicles. The traction-engines heretofore employed have been generally formed of apparatus having broad-faced wheels provided with spikes, cleats, or other means of holding upon the ground, and obtaining the traction or hold by the weight of the apparatus, as also by the devices upon the wheels, or by the construction of the wheels whereby they are adapted to yield and bring the broader faces in contact with the ground. In these apparatus difficulty has been experienced because of the weight thereof, and because the apparatus was not adapted to operate on soft or wet ground, the hold not being sufficient to overcome the drag on the wheels or prevent the slipping of the apparatus.

The object of my invention is to provide a traction-power which does not require a great weight in order to obtain a hold on the surface, and which can be operated whether the ground be soft or not, as well as to lessen the power necessary to operate the same.

It consists, essentially, in a frame supported at the front on suitable wheels, and having at the rear a power-shaft carrying a series of eccentrics journaled within legs or bars, said series of bars being provided with feet or shoes supporting the frame and extending up through the guide-frame above the shaft, so that on the rotation of said power-shaft said feet are caused to engage with the ground and push forward said frame, and are then raised free of the ground and carried forward in position to repeat the stroke, the apparatus having, therefore, the full hold or traction of these shoes upon the surface, and being arranged to raise these shoes off the ground as soon as they lose their power in pushing forward the frame.

It also consists in providing each leg or bar with a branch or supplemental leg and foot to give it a broader surface to support the weight, greater traction, and enable it to better accommodate itself to any uneven or sloping surface.

It also consists in certain improvements in the means of supporting the boiler or boiler and engine within the frame of the apparatus, so that they will maintain a vertical position therein when the apparatus is passing over sloping or uneven ground.

It also consists in certain improvements in the construction of the parts to obtain the desired motion, and other improvements in the apparatus employed.

To enable others skilled in the art to make and use my invention, I will describe the same, referring to the accompanying drawings, in which—

Figure 2:
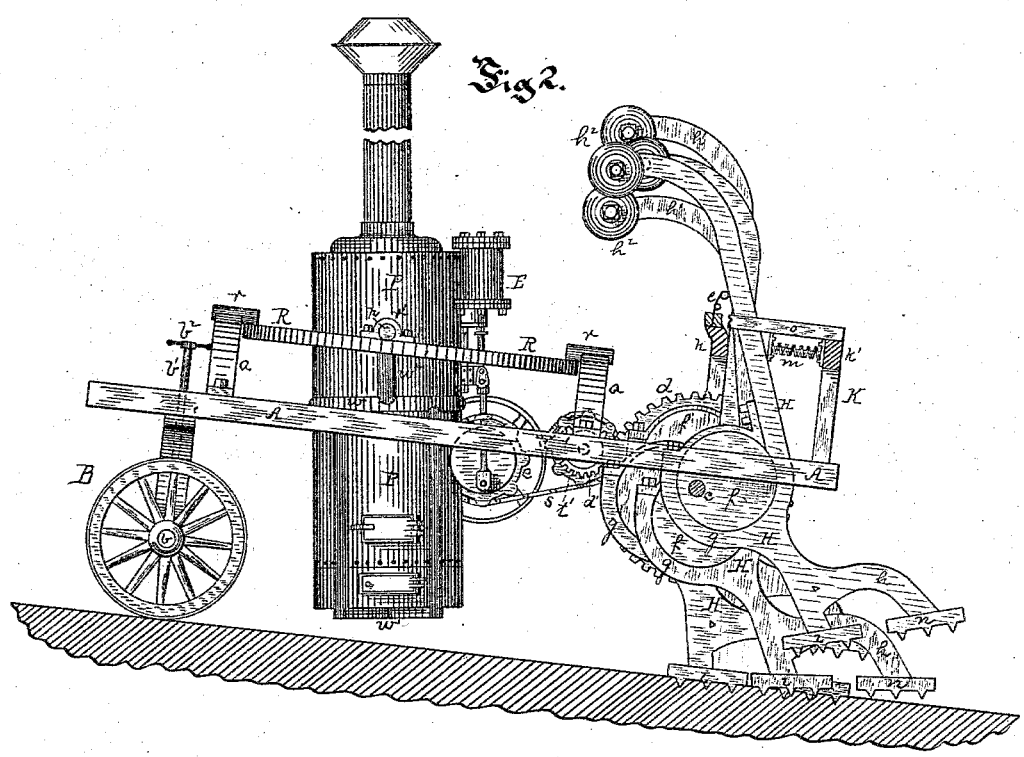
Figure 8:
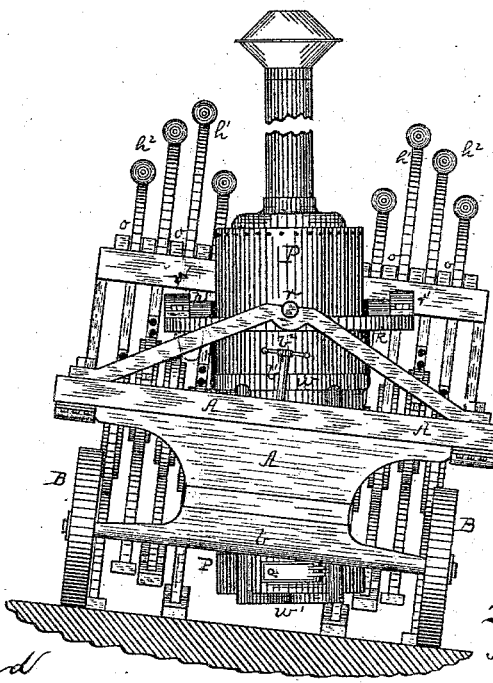

Figure 1 is a side view, partly broken away, illustrating the same. Fig. 2 is a like view, showing the apparatus on sloping ground. Figs. 3 and 4 are rear views thereof in different positions. Fig. 5 is a view of one bar or leg, showing the eccentric in the bearing thereof. Fig. 6 is a view of one eccentric, and Fig. 7 is a perspective view of the foot or shoe, and Fig. 8 is a front view, showing the apparatus on sidling ground.

Like letters of reference indicate like parts in each.

In the drawings referred to, A represents the frame of the apparatus, which is supported at the front on the wheels B, mounted on the axle $b$, and secured thereto by the ordinary fifth-wheel, so that the axle will turn below the frame. The axle $b$ is secured to the shaft $b'$, which extends up through the frame, and is provided at the top with a suitable hand-wheel, $b^2$, by means of which the front wheels may be turned by the operator, and thus guide the apparatus in whatever direction may be desired. At the rear of the frame is the shaft $c$, journaled in suitable bearings, $c'$, at either side of the frame. This shaft $c$ is turned by the cog-wheel $d$, secured thereto, said cog-wheel gearing with the pinion $d'$, which is turned by power communicated from the engine E, as hereafter described. If desired, two sets of this spur-gearing, to vary the speed or power of the apparatus, may be employed. The gearing generally employed is such as to increase the power about ten times, this being generally sufficient for all purposes. Mounted on the shaft $c$ are a series of eccentrics, $f$, the eccentrics having side flanges, $f'$, and fitting within boxes $g$, formed with or secured to the legs or bars H. In the apparatus shown eight of these legs are employed, the legs being formed of wrought metal, and being strong enough to support the weight of the apparatus and take the jars caused by the uneven surface of the ground over which they travel. The one half of the journal-boxes $g$ are preferably formed with the bars H, the other half or covers $g'$ thereof being bolted to the bars and boxes to form circular bearings for the eccentrics. The edges of these journal-boxes $g$ and covers $g'$ fit within the side flanges, $f'$, of the eccentrics, so that the bars are held by the eccentrics in proper vertical position. The bars H are provided at the base with the flat feet $i$, the feet being preferably rigidly secured to the bars, though they may, if desired, be pivoted thereto, as shown in Fig. 7, so as to conform to the surface of the ground. Where the feet are pivoted to the bars, universal joints are preferably employed for this purpose, so that they may have to a limited extent movement thereon both in the direction of their length and width. At the back of the frame A is supported the upper or guide frame, K, and the bars H extend up above this frame between the front cross-bar, $k$, and rear cross-bar, $k'$, thereof, suitable guide-bars, $o$, extending longitudinally across between the cross-bars $k$ $k'$, and thus forming guides for the movement of the upper part of the bars. After passing through the upper frame, the bars H are bent forward, as at $h'$, and provided with the weights $h^2$, by means of which leverage they are always held against the front cross-bar, $k$, of the guide-frame when not carried back by the eccentric or by contact with the ground, as hereinafter described. The weights $h^2$ can be adjusted on the curved part $h'$ of the bars H, to regulate the leverage on the bars.

Secured to the front cross-bar, $k$, are suitable cushioning springs, $l$, to cushion the bars H when they are drawn back by the weights $h^2$ against this bar, and to prevent the unnecessary jar of the apparatus, the springs being provided with idle-wheels to prevent friction. The construction of these springs $l$ may of course be changed as desired, those shown being one of the constructions proper for the purpose. Instead of curving the bars H and providing them with the weights $h^2$, or in addition thereto, springs $m$ may be arranged between the guide-bars $o$, to press the bars forward against the cross-bar $k$. The bars are preferably provided with the branch legs $h$ and feet $n$, to increase the traction and give greater hold where the apparatus is traveling over sloping or uneven ground. These branch legs and feet are not, however, necessary to the successful operation of the apparatus. In the apparatus shown, as above referred to, eight of these bars H, with their broad feet $i$, are employed, and they are arranged so that two bars or legs—one on each side of the frame— will move together, the eccentrics being secured on the shaft $c$ in different positions, so that the feet come in contact or engage with the surface of the ground at different times, two feet on each side being generally in contact therewith, the one coming in contact therewith before the other is raised therefrom. The number of these bars may of course be increased, if desired; but for practical purposes the number shown will be sufficient. The movement of these feet is substantially shown in Figs. 1, 2, 3, and 4, which illustrate the manner in which they engage with, bear upon, and rise from the surface over which they are passing. The feet $i$ and $n$ are made broad and long to give broad bearing-surfaces, and are provided with spikes or cleats $v$ on the lower surface thereof to increase the hold or traction thereof. In the front part of the frame, supported on beams or girders hanging therefrom, is the vertical boiler P and the vertical engine E, this style of engine and boiler being preferred by me to operate the apparatus, though any suitable boiler and engine may be employed for the purpose.

In traveling over fields or roads the engine often encounters much sloping ground, and when the front, back, or sides are raised the boiler is tilted from its vertical position, and consequently the water is thrown to one side or end thereof, and parts of the boiler are liable to be left unprotected from the heat of the furnace, and accidents are often caused in this way. To overcome this difficulty, I so support the boiler that it remains in a vertical position even when the apparatus is tilted out of line. This I accomplish by providing the frame with the bearings $a$ $a'$, raised above the frame and preferably extending across it, and supporting in said bearings the heavy metal ring R, in which the boiler is hung by the pivot-bars $p$. The ring R is provided with the pivot-bars $r$, which rest in the bearings $a$ $a'$, being held therein in suitable boxes, if desired, and at points on said ring midway between these bearings $a$ $a'$ are the journal-boxes $r'$, in which are journaled the pivot-bars $p$ of the boiler. These pivot-bars $p$ may be secured to the boiler in any suitable way, the manner preferred by me being illustrated in the drawings, the ring $w$ fitting around the boiler near the center thereof, and carrying a suitable basket, $w'$, formed of heavy girders, in which the boiler fits, and the pivot-bars $p$ being secured to the bars $w^2$, extending up from the ring $w$. The ring may, however, be riveted or otherwise secured to the boiler and the basket be dispensed with.

Where the apparatus is traveling up or down an incline, the boiler swings on its pivot-bars $p$, journaled in the ring R, and thus maintains its vertical position, and where the apparatus is tilted up on one side the ring R, on account of the weight of the boiler, swings on its journal-bars *r* in the bearings *a a'*, and the boiler is thus held in its proper position. The engine E is preferably secured to the boiler, as shown, so that its connections therewith may be made permanent. As the power is preferably communicated from the engine by an endless chain, the movement thereof will not affect the operation of the apparatus. When so communicated the engine-shaft has the chain-pulley *e*, and the shaft *t*, carrying the pinion *d'*, is provided with the chain-pulley *t'*, the pulleys being connected by the chain *s*. As the chain hangs loosely over the pulleys, it allows for any swinging or tilting of the apparatus, as above described. Where the engine is secured to the frame A, its power may be communicated to the gear-wheel *d* by cog-gearing, and steam carried to the engine by flexible connections.

In the operation of the apparatus, the power from the engine E is communicated in the manner above described to the gear-wheel *d* on the shaft *c*, and on the rotation of the shaft one leg or bar, H, on each side—as, for example, the outer ones, H'—are lowered, so that the shoes or feet *i* and *n* engage with the ground, and upon the further rotation of the eccentrics *f* the bar is pushed back, so that on account of the traction or hold of the shoes on the ground they push forward the apparatus. Upon the further rotation of the eccentrics the bars, on reaching the end of the stroke, are raised from the ground, and as soon as clear therefrom the weights $h^2$ or springs *m* throw the upper ends of the bars forward against the front cross-beam, *k*, or the cushion-springs *l* thereon, and thus raise the front feet, *n*, so that they can be carried forward, on the further rotation of the eccentrics, to the point where they again engage with the surface of the ground. In the meantime, traveling in the same course, the next pair of feet, $H^2 H^2$, engages with the surface, followed by the next pair, $H^3 H^3$, and afterward the inner pair, $H^4 H^4$, one pair engaging with the surface before the former pair leaves, and so supporting the back of the apparatus. The feet are thus, by means of the eccentrics, caused to engage with the surface, support the apparatus, push it forward, and finally rise from the ground and move forward to position to again engage with the surface and push forward.

When the apparatus is traveling up or down an incline or over uneven ground, as the bars have free space to move within the upper or guide frame, K, they swing therein, and so permit the shoes to accommodate themselves to the surface of the ground, so that no traction is lost. The supplemental shoes *n* also materially assist the traction in such cases. As the faces of the shoes are broad and long, and they rest for their entire face on the ground, it is evident that they obtain a greater traction from surface contact than the ordinary broad-faced wheels. As the shoes remain in the same position on the ground during their entire pushing "stroke," it is evident that they are not so liable to slip as the ordinary cleated wheel, which is continuously changing its position and relies for its hold upon a comparatively narrow arc of the circumference of the wheel. As the feet are lowered their entire faces come in contact at once, and thus obtain a direct hold, and this hold continues until they are relieved of the weight by the next pair of feet. In passing over soft or muddy ground the traction is increased by their sinking into the soil, and at the end of the stroke they are raised by the eccentrics in substantially a vertical line, so that but little force is required, and as another pair of feet are supporting the weight, this pressure is exerted through the eccentrics against these feet, and increases the traction. On account of the great traction, it is unnecessary to make the apparatus heavy, and it can therefore be made about one-half the weight of the ordinary traction apparatus of the same power.

I am aware that a walking vehicle has been propelled by means of legs or bars journaled on eccentrics and having their upper ends connected by rods to a crank-shaft, the bars being raised and lowered by the eccentrics and receiving an oscillating motion from the crank-shaft. By my invention, however, I dispense with the crank-shaft, which is not practicable in heavy machines for traction purposes, and obtain the desired motion simply from the eccentrics and the employment of the upper frame, and as but one power-connection is employed the power may be increased or diminished by the employment of simple gearing, and the legs or bars can accommodate themselves to the surface of the ground, so that a more practical and durable apparatus is obtained.

What I claim as my invention, and desire to secure by Letters Patent, is—

1. The combination of the frame A, having the cross-bar *k* supported above it, the shaft *c*, carrying the eccentrics *f*, and legs or bars H, journaled to said eccentrics and extending up back of said cross-bar *k*, substantially as and for the purposes set forth.

2. The combination of the frame A, having the upper guide-frame, K, the shaft *c*, carrying the eccentrics *f*, and legs or bars H, journalled to said eccentrics and extending up within said guide-frame, substantially as and for the purpose set forth.

3. The combination, with the frame A, having the upper guide-frame, K, of the legs or bars extending through said guide-frame, and having the curved upper ends, *h'*, and weights $h^2$, substantially as and for the purposes set forth.

4. In combination with the frame A, having the upper guide-frame, K, the legs or bars extending through said guide-frame, and cushioning-springs *l*, substantially as and for the purposes set forth.

5. In combination with the frame A, having the upper guide-frame, K, the legs or bars H, extending through said frame, and the springs *m*, secured in said frame, substantially as and for the purposes set forth.

6. The combination of the leg or bar H, having the journal-box *g*, formed therewith and extending out therefrom, cover *g'*, and eccentrics *f*, having the side flanges, *f'*, substantially as and for the purposes set forth.

7. In traction-powers, the frame A, having the bearings *a a'*, ring R, pivoted thereon, and boiler P, pivoted on said ring, substantially as and for the purposes set forth.

8. In traction-powers, the frame A, having the bearings *a a'*, ring R, pivoted thereon, boiler P, and basket *w'*, carrying said boiler and pivoted on said ring, substantially as and for the purposes set forth.

9. In traction-powers, the boiler P and engine E, movably hung in the frame thereof, in combination with a power-shaft and chain-power connections between said engine and shaft, substantially as and for the purposes set forth.

10. In traction-powers, the leg or bar H, having the branch *h* and feet or shoes *n*, substantially as and for the purposes set forth.

In testimony whereof I, the said HENRY B. McMURRAY, have hereunto set my hand.

HENRY B. McMURRAY.

Witnesses:
JAMES I. KAY,
J. U. COOKE.